US010514252B2

(12) United States Patent
Bomba

(10) Patent No.: US 10,514,252 B2
(45) Date of Patent: Dec. 24, 2019

(54) SHAPE-DETECTING MACHINE FOR SLENDER ARTICLES

(71) Applicant: RDE COMPANY S.R.L., Milan (IT)

(72) Inventor: Gabriele Bomba, Milan (IT)

(73) Assignee: RDE COMPANY S.R.L., Milan (IT)

( * ) Notice: Subject to any disclaimer, the term of this patent is extended or adjusted under 35 U.S.C. 154(b) by 0 days.

(21) Appl. No.: 16/090,422

(22) PCT Filed: Mar. 28, 2017

(86) PCT No.: PCT/IB2017/051773
§ 371 (c)(1),
(2) Date: Oct. 1, 2018

(87) PCT Pub. No.: WO2017/168326
PCT Pub. Date: Oct. 5, 2017

(65) Prior Publication Data
US 2019/0120615 A1    Apr. 25, 2019

(30) Foreign Application Priority Data
Apr. 1, 2016 (IT) .............................. 1020160033753

(51) Int. Cl.
*G01B 11/24* (2006.01)
*G01B 7/34* (2006.01)
*G01B 7/293* (2006.01)

(52) U.S. Cl.
CPC .............. *G01B 11/24* (2013.01); *G01B 7/345* (2013.01); *G01B 7/293* (2013.01)

(58) Field of Classification Search
CPC ......... G01B 11/24; G01B 7/345; G01B 7/293
USPC ....................................................... 356/601
See application file for complete search history.

(56) References Cited

U.S. PATENT DOCUMENTS

| 7,225,665 | B2 * | 6/2007 | Goforth | ................ | G01B 11/06 73/105 |
| 7,509,218 | B2 | 3/2009 | Hoysan et al. | | |
| 7,856,895 | B2 | 12/2010 | Syassen | | |
| 2007/0028681 | A1 * | 2/2007 | Goforth | ................ | G01B 11/06 73/159 |

(Continued)

FOREIGN PATENT DOCUMENTS

| DE | 40 09 144 A1 | 9/1990 |
| DE | 10 2006 002 093 A1 | 7/2007 |

(Continued)

OTHER PUBLICATIONS

International Search Report and Written Opinion, dated Aug. 8, 2017, from corresponding PCT application No. PCT/IB2017/051773.

*Primary Examiner* — Roy M Punnoose
(74) *Attorney, Agent, or Firm* — Young & Thompson

(57) ABSTRACT

A geometry-detecting machine for a slender body includes a fixed reference frame (30, 31) provided with at least one pair of constraint points (1) for the slender body and sensor element (28) for the spatial detection of the geometry of the slender body, wherein the constraint points are in the shape of vertical constraints points (1, 3, 5) coupled in pairs by interconnecting element (4, 34) in turn making up vertical constraint points to be coupled in pairs on multiple levels and wherein the interconnection element are pivoting arms, such to allow the slender body to meander freely in order to guarantee for the slender body an attitude as natural as possible.

20 Claims, 9 Drawing Sheets

(56) References Cited

U.S. PATENT DOCUMENTS

2008/0120044 A1  5/2008  Hoysan
2009/0031824 A1  2/2009  Syassen

FOREIGN PATENT DOCUMENTS

| EP | 1 915 323 A1 | 4/2008 |
| EP | 1 974 179 A2 | 10/2008 |
| EP | 2 057 438 A2 | 5/2009 |
| JP | S59-34109 A | 2/1984 |
| JP | H06-331339 A | 12/1994 |
| WO | 2007/018902 A1 | 2/2007 |
| WO | 2007/082740 A2 | 7/2007 |
| WO | 2008/063550 A2 | 5/2008 |

* cited by examiner

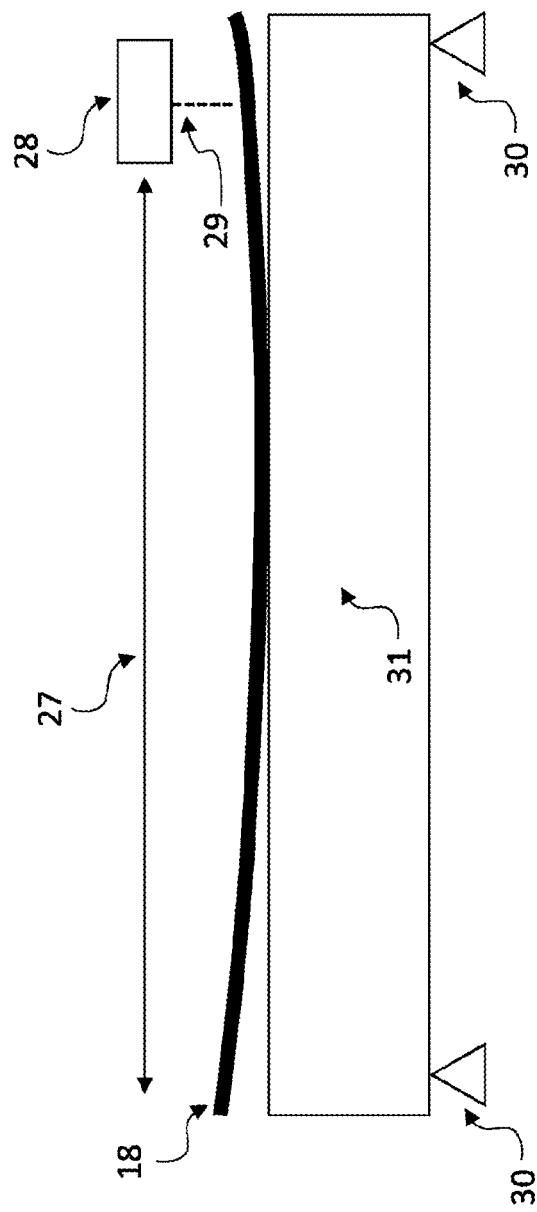

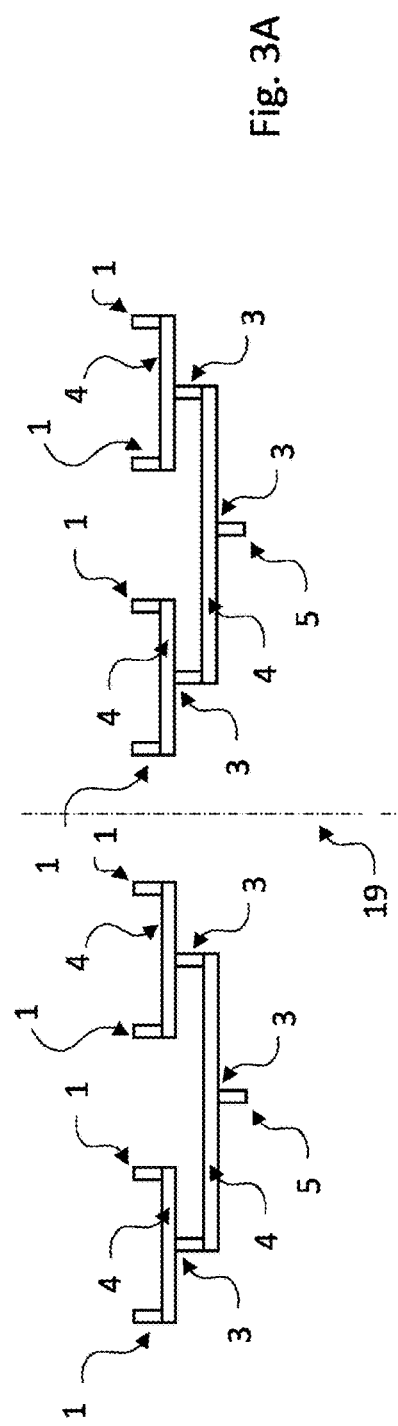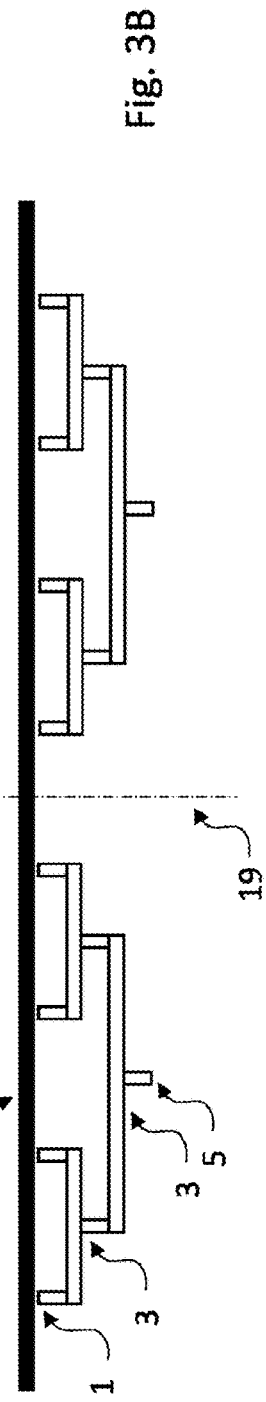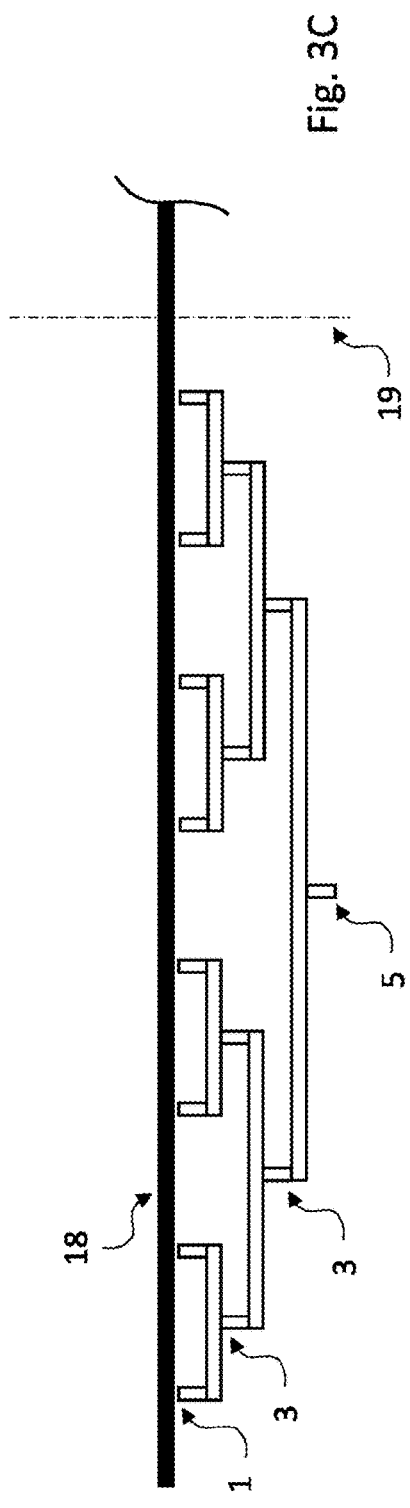

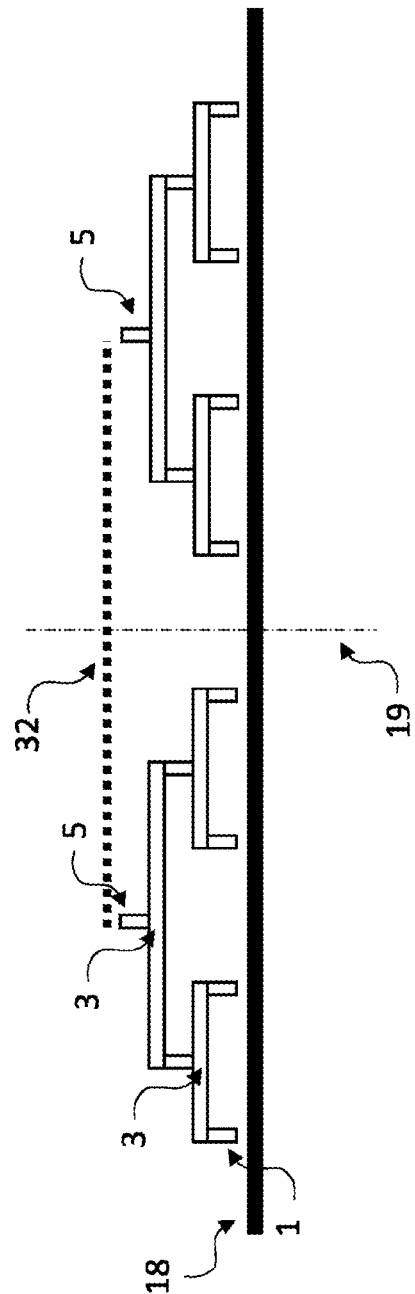

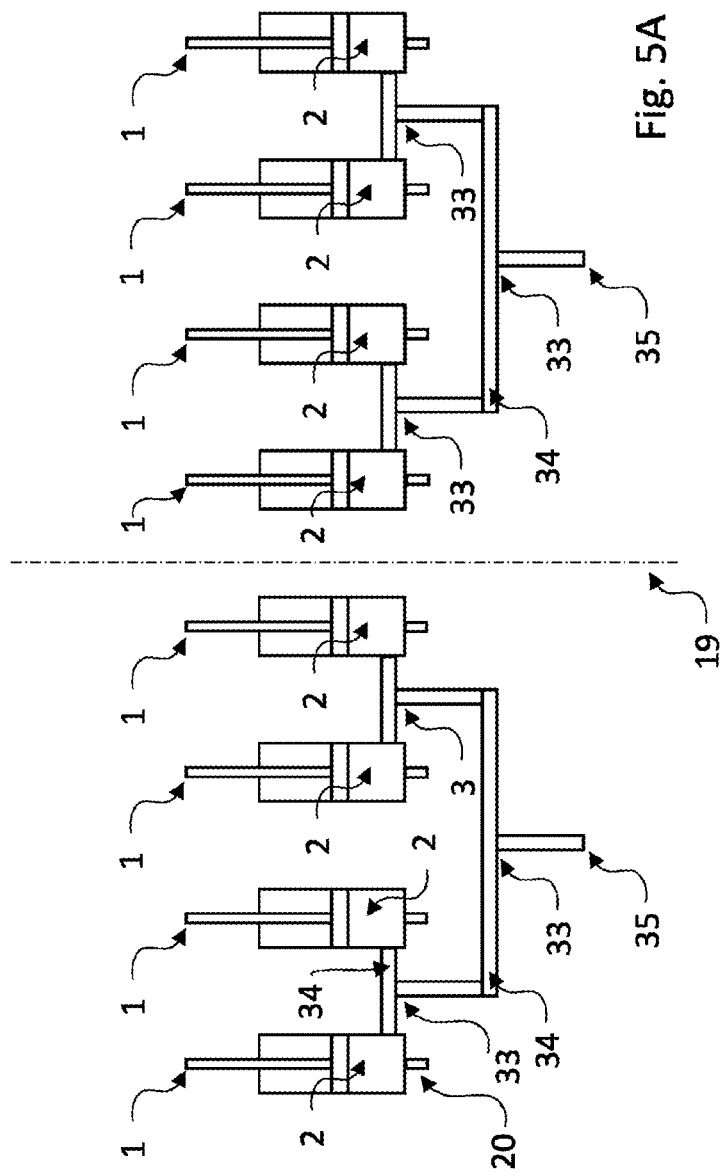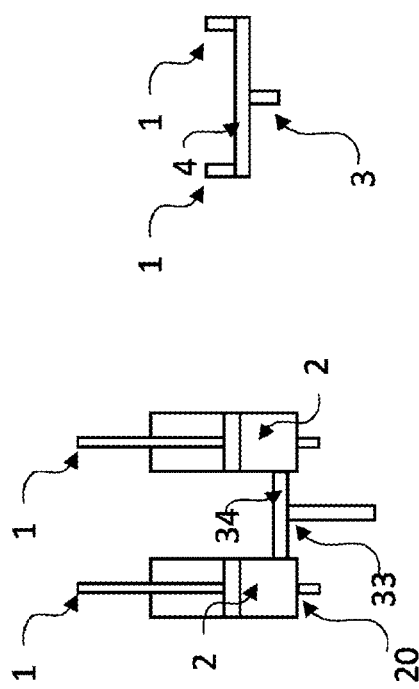

SHAPE-DETECTING MACHINE FOR SLENDER ARTICLES

FIELD OF THE INVENTION

The present invention relates to a shape-detecting device for slender articles and for the accurate determination of the geometric information of the articles, without the effect of gravitational bending and friction.

BACKGROUND ART

The manufacturing of slender products is carried out by extrusion, drawing and, more generally, by hot and/or cold longitudinal deformation. In an ideal condition, the site of the points connecting the section centres of a slender article, along the axial direction, should normally lie on a perfect straight line, but the technological issues for manufacturing cause this important condition to be obtainable only with a given level of approximation.

FIG. 1, which represents a slender article known per se, shows, by way of example, an article 18 having a round section 24, 25 (alternatively, the articles are also produced with hexagonal section, square section, etc.), wherein it is evident how the straightness axis 23 does not coincide with the site of the section centres 26; in this figure the view is very compressed in order to reduce the size of the image, but it should be noted that the curvilinear abscissa 26 is in the order of metres and the cross-sectional size is in the order of tens of millimetres, from which the slenderness of the article is resulting.

The geometric straightness condition of the article, whatever the geometric shape of the section is, is very important for subsequent processing aspects of the product, especially if the article is rotated at high speed along its main axis. The straightness is defined by standards (refer to FIG. 1) as the maximum deviation 22 of the arc 26 from the baseline 23; the perfect straightness (practically only theoretical) is reached when the actual points of the article 26 coincide with the points of the theoretical axis 23 and consequently the deviation 22 is zero.

Given the complexity of realizing and achieving this geometrical condition, and given the need to guarantee a more and more rectilinear product for subsequent processing, being able to measure the residual deformation of the manufactured product is very useful, so as to perform both discarding activities of non-compliant products due to an excess of curvature, and the classification of intermediate quality products based on the obtained level of straightness. The residual tensile state in the product, downstream of the hot and/or cold processing, is the cause of the residual deformation thereof with respect to the condition of perfect straightness.

In the field of production of slender articles (typically, bars with different sections) there are regulations defining the acceptability fields of these articles based on materials they are made of, on size and on section geometry. These values are normally expressed in terms of sagitta (deviation), i.e. the maximum arc deviation with respect to a fixed-length baseline, and are quantified in the measurement unit of mm/m with the intent of representing the size of the sagitta with respect to a predetermined reference arc. The limit values of acceptability are the result of a compromise between the manufacturing problems and the need for subsequent processes.

Over the years, many manufacturers of systems and, more particularly, of measurement systems, have dedicated resources to define methodologies capable of automatically obtain measures that could be attributable to the values considered by the reference standards. The main known systems are based on measurement methods envisaging the step of rotating the slender article on fixed supports, thus determining the straightness values on the basis of the vertical position variations of the slender article detected in different points of the same or simply in a median position with respect to the above-mentioned points. Other systems are based on rolling principles of the article on inclined planes, with detecting and evaluating of points of contact with the plane during or after the rolling.

For the detection of the geometry of the slender article on various rolling systems, various measurement techniques have been adopted. The main techniques are of the mechanical type with contact, also known as feelers; of laser-optical type with punctual sensors or profilometres, of visual-optical type through the use of cameras with lens systems, even telecentric, or of electric type through the closure of electrical contacts placed in very precise positions.

The systems for the geometry detection of slender articles lying, during the measurement, on vertically fixed references, raises the limit of conditioning that the fixed support system exerts on the geometry of the slender article itself, making the measurement extremely inaccurate.

There are also more sophisticated systems which provide the geometry detection of the slender article on non-fixed support systems. The purpose of these, systems is to create compensations to the effect of gravity on the geometry to be detected. Systems of this type, which employ different suspension technologies, are known from EP 2057438, EP 1974179, EP 1915323, JP 063331339 and JP S5934109. None of these solutions of the prior art provide a system that is simple and reliable at the same time, but actually effective to support a slender body or article in a way substantially free of constraints affecting its actual natural shape.

SUMMARY OF THE INVENTION

The purpose of the present invention is to provide a system for detecting the actual geometry of a slender article, which operates with the article lying on a special support system which guarantees an attitude as natural as possible.

This object is achieved by a machine as essentially described in the appended claims.

BRIEF DESCRIPTION OF THE FIGURES

Further features and advantages of the invention will anyhow become more evident from the following detailed description of preferred embodiments, given by mere way of non-limiting example and illustrated in the accompanying drawings, wherein:

FIG. 2 is a schematic elevational side view of a geometry-detecting system;

FIGS. 3A, 3B, 3C and 4 are schematic elevational side views of various embodiments of the suspension system according to the invention;

FIGS. 5A, 5B, 5C and 6 are schematic views of details of the invention according to different embodiments;

DESCRIPTION OF THE CURRENTLY PREFERRED EMBODIMENTS

Figure 1:
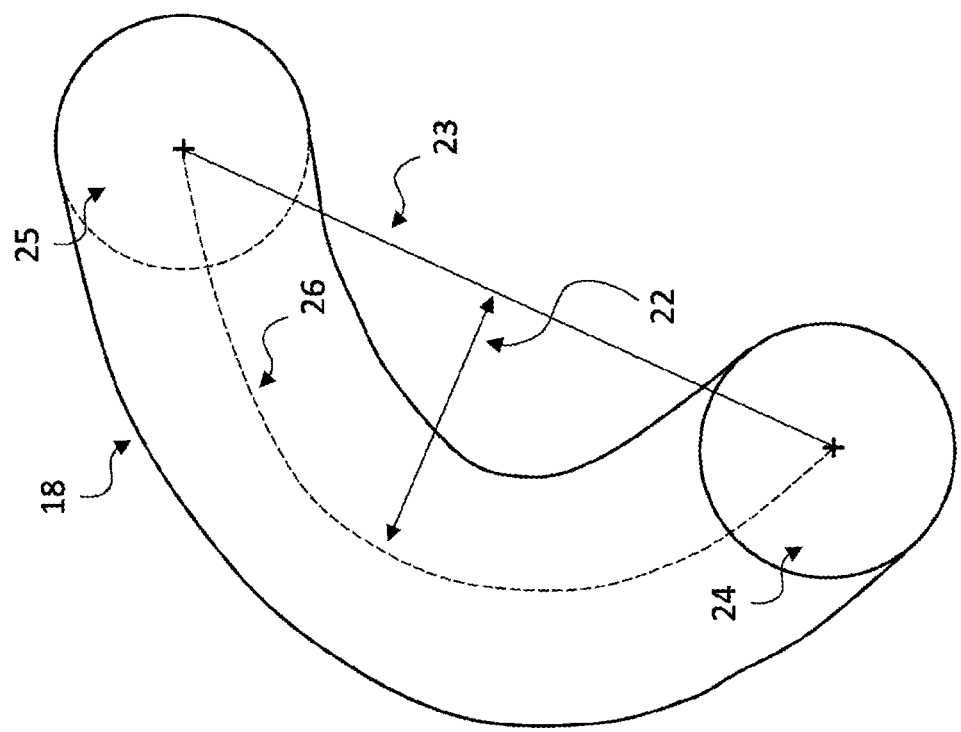
FIG. 1, as already mentioned, is a schematic view representing an exemplary rod-like body.

Each body may be considered flexible especially if slender; in this case, the total flexural elasticity is not sufficiently low to prevent deformations due to the effect of gravity or at least to prevent the gravitational deflections from being far greater than the extent of natural deviations to be detected.

The concept underlying the invention is to create support points capable of counterbalancing the gravitational bias of a slender body or article, allowing at the same time the article to reach at balance a neutral configuration with respect to internal tensions. In this way, the geometric detection will be representative of the actual shape of the article and will provide a reliable and accurate indication with respect both to the engineering applications of the article itself, and to the setup and regulation of the necessary processes for its production.

The purpose of the system is to allow the manufactured article, during the measurement step, to have support constraining reactions distributed in an appropriate manner, i.e. leaving the same support points free to move in the vertical direction in such a way as to delete the internal tensions due to the gravitational bendings.

The system of the invention allows the distribution of the vertical reaction forces, applying them in specific positions, in such a way that the slender article is able to restore the balance of the internal (elastic) tensions taking an attitude in this way according to its actual shape. At this point, through mechanical, optical or electrical, fixed or movable systems, it is possible to carry out the detection of the same position acquiring its actual shape.

Once the actual shape is acquired, it is possible to perform many analyses of geometrical and mathematical type.

Referring to the figures, the detection involves the acquisition of the position of the sections from the first to the last 25, to be therefore able to process data such as the maximum sagittal (deviation) 22, the position of the latter along an ideal straight line 22, the curvilinear abscissa 26, as well as the analysis of gradients or specific variations of curvature.

To achieve this result, the Applicant has devised a system in which the vertical support points have a particular interaction scheme and a tree-type connecting structure on successive layers. The teaching is to achieve a splitting of the reaction forces by successive doublings through an approach of physical, fluidic, mechanical or hybrid linkages to always allow their perfect redistribution. In the condition in which the vertical forces react to gravitational bending, the residual distortion is minimized, highlighting the actual shape.

The arrangement envisages, on the vertical plane, the interconnection of vertical constraints or supports in pairs for a slender article; each pair of vertical constraints interacts with successive constraint layers as the sum of two portions and subsequently performing systematic interconnections in pairs, converging towards a single final point of the vertical constraint.

This scheme is valid both in compression and in traction and therefore it can be implemented in the form of system both to suspend the slender article from above (traction action) and to support it from the bottom (compression action).

From a practical point of view, in the traction scheme it is possible to arrive at a single point which will support the entire weight; otherwise, in the case of the compression scheme, it will be more useful to stop at the penultimate layer, with two vertical constraint or support points such as to distribute the total load as a function of the distance from the centre of gravity of the article (better if lying on the median axis) to have a stable support system of the article.

Once defined on how many vertical constraints or supports it is desirable to distribute the weight of the bar, they must be equal in number to a power of two ($2^N$), interconnected in pairs into a number of sublayers equal to the logarithm in base two of the expected number V of vertical constraints or supports ($\text{Log}_2(V)$), with a symmetrical scheme with respect to the middle line of the slender article to be detected.

Assuming, for example, that it should be supported a slender article (for example a bar) with 16 supports, because it is believed that the span is sufficiently small as to be able to neglect the flexions due to the actual weight of the article between a support point and the other, it is necessary to achieve 4 layers (4 is the logarithm in base two of 16); in the first layer there are 16 supports, in the second layer 16 supports are collected in 8 pairs, in the third the eight pairs are collected in four, in the fourth the four pairs are collected in the two final pairs which in turn will lie on the floor (i.e. on the fixed reference of the machine). In any collection, it is necessary to cause a balance between the forces, regardless of the vertical positions of the external joint points. From this example, it results that the conceived arrangement provides a scheme of symmetrical supports with respect to the middle line of the slender article in an amount equal to a power of two ($2^N$)

these supports or joints are grouped in pairs and the number of layers is equal to the logarithm in base two of the number of supports.

Moreover, the proposed system optionally provides for each vertical constraint or support a free transversal movable system, in order to allow the article to meander freely up to assume its free shape even on the horizontal plane. The system provides an ability of adapting the lengths of the interconnecting elements of the constraints, in order to always present a proper redistribution of the internal tensions to obtain the free balanced neutral shape.

The system can feature sensors adapted for the spatial detection of the slender article in its free geometry, in the form of either rotation sensors of the interconnecting arms for each layer or position detectors of the slender article for sections through profilometres or mechanical feelers (these latter are not recommended in order not to excessively affect the measurement accuracy).

The system can be equipped with auxiliary (pneumatic or electrical) equipment for locking the mechanical systems or the flow of a fluid component in order to keep all the support system still during the phases in which the article is not present on the measuring system, so as to obtain a support in a predetermined neutral position in the phase of laying a new article to be detected.

The following will provide a further detailed disclosure with reference to the single accompanying figures.

FIG. 2 shows a typical scheme of a detection system of a slender article in the form of bar, wherein an optical system 28 is moved along a precision trajectory 27 in order to reconstruct its geometry. In this case, the structure of the machine supporting the precision movement 27 also constitutes the fixed frame or rigid base on which, ultimately, the article to be measured 18 is supported: this reference structure 31 lies on the ground through supporting feet 30.

FIG. 3 shows a diagram of the support of the article 18 in two cases: with 8 supports in FIGS. 3A and 3B, and with 16 supports in FIG. 3C. In the latter case, the left part symmetrical to the centre axis 19 is not shown. The support scheme provides a tree-type structure in which the supports 1 at the first layer become four joints 3 in the cases of FIGS. 3A and 3B and eight joints 3 in the case of FIG. 3C, then passing to two final joints 3 in the cases of FIGS. 3A and 3B, to be then constrained to the ground (i.e. to the fixed reference) through the final support constraints 5.

In the case of FIG. 3C there is an additional layer of four joints, before passing to the last layer with the final support constraints 5. In these representations, it is possible to observe the presence of interconnecting elements 4 between the vertical constraint or support points 1 and between the joint points 3. The scheme of symmetry with respect to the centreline 19 of the bar is important.

FIG. 3 show a type of interconnection between the joints of the mechanical type, envisaging the arrangement in the support 1 and joint 3 points of hinges allowing the free rotation of the interconnecting elements 4 in the shape of mechanical arms. The symmetry of the system with respect to the centreline 19 is important, while the position of the support points may be non-uniform and the lengths of the interconnecting elements 4 can be variable and controlled through automatic management systems.

FIG. 4 shows a suspension scheme in which the final points of the two branches are attached to a fixed reference system 32 which has a function similar to the structure 31. In this specific case, the system 32 can also stably be constrained to the ground at a single point, the system having a lower centre of gravity with respect to said constraint point.

FIG. 5A shows an equivalent system but with interconnecting elements of the fluidic type. In fact, the balance of the pairs in the hinges 3 is equivalent to the conservation of flow rate in the joints 33; the interconnections in this case are fluid ducts and the chambers 2 guarantee the equivalence of the vertical reaction forces in the support points 1. In the fluidic case, the point 35 is a flow feed point, while the constraining to the ground is achieved through the connections 20.

In other words, the arrangement where a special balancing, starting from the support constraints of the article up to the fixed reference on the ground, is provided with mechanical arm systems, can also be obtained with an interconnection system of the fluidic type. Advantageously, the use of incompressible fluids that are distributed inside pipes in fluid communication, causes a corresponding behaviour to that of rigid arms, since the rotations of the connecting devices between the constraints (i.e. the rigid arms) are equivalent to the (incompressible) fluid displacement, and the balances at the rotation in the rigid arms are equivalent to the conservation of the mass of the fluid and of the flow rates. The practical implementation of such a system involves the use of vertical plunger means, in which the pressure chambers are interconnected with each other and in turn interconnected with other groups with an interconnection layers scheme fully equivalent to the mechanical arms approach; the fluidic connections should be realized through as rigid as possible pipes and the friction of the plunger systems must be as low as possible, opting for membrane plungers rather than piston systems. Also conceivable is the use of compressible fluids, with some pressure balance adjustments.

The figure shows an exemplary scheme. The vertical constraint or support 1 points of the slender article are formed at the end of a plunger rod in a single-effect hydraulic actuator 2, wherein the stem is mounted vertically movable in cooperation with a lower chamber containing fluid; homologous chambers of each actuator are communicating with each other in pairs by means of an interconnecting element in the form of a fluid communication pipe 34. In turn, this first layer of interconnecting elements 34 is in fluid communication with an additional layer of interconnecting elements in the form of communication pipe 34, and so on, until it ends in a final pair of "supports" constituted by termination pipe portions, to which, for example, it is possible to attach a supply of fluid under pressure which allows to set the system at the beginning, based on the weight of the article to be supported.

Figure 6:
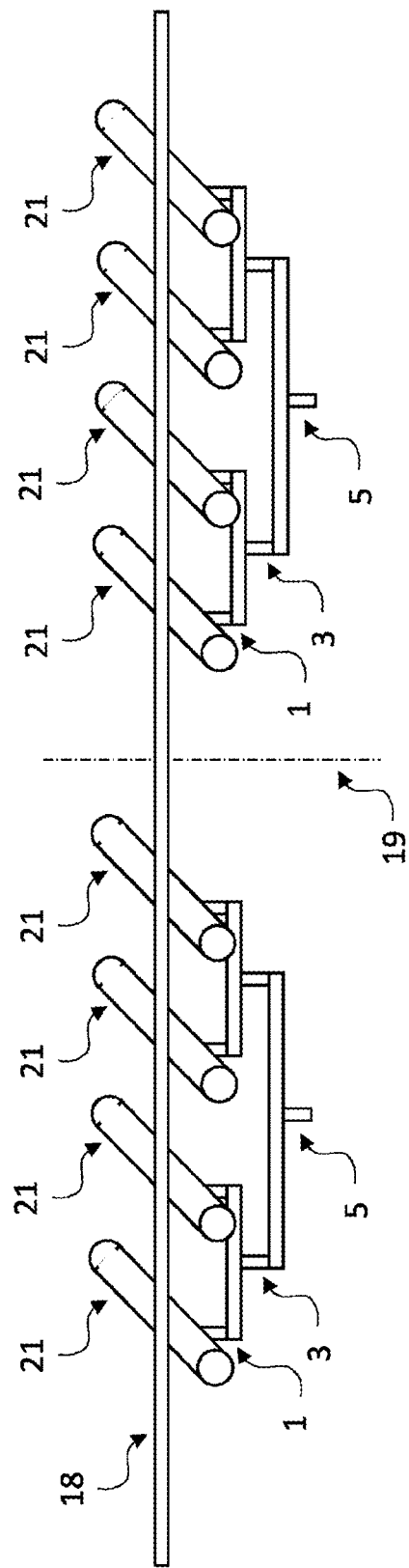

FIG. 6 shows free translation means 21 on each support 1 in the support tree-type scheme, as previously described. In particular, each support 1 has a roller member 21 which allows the free longitudinal sliding of the slender article 18 and its free transversal sliding, so that the article 18 may meander freely on the supports 1 in the form of rollers 21.

Figure 7:
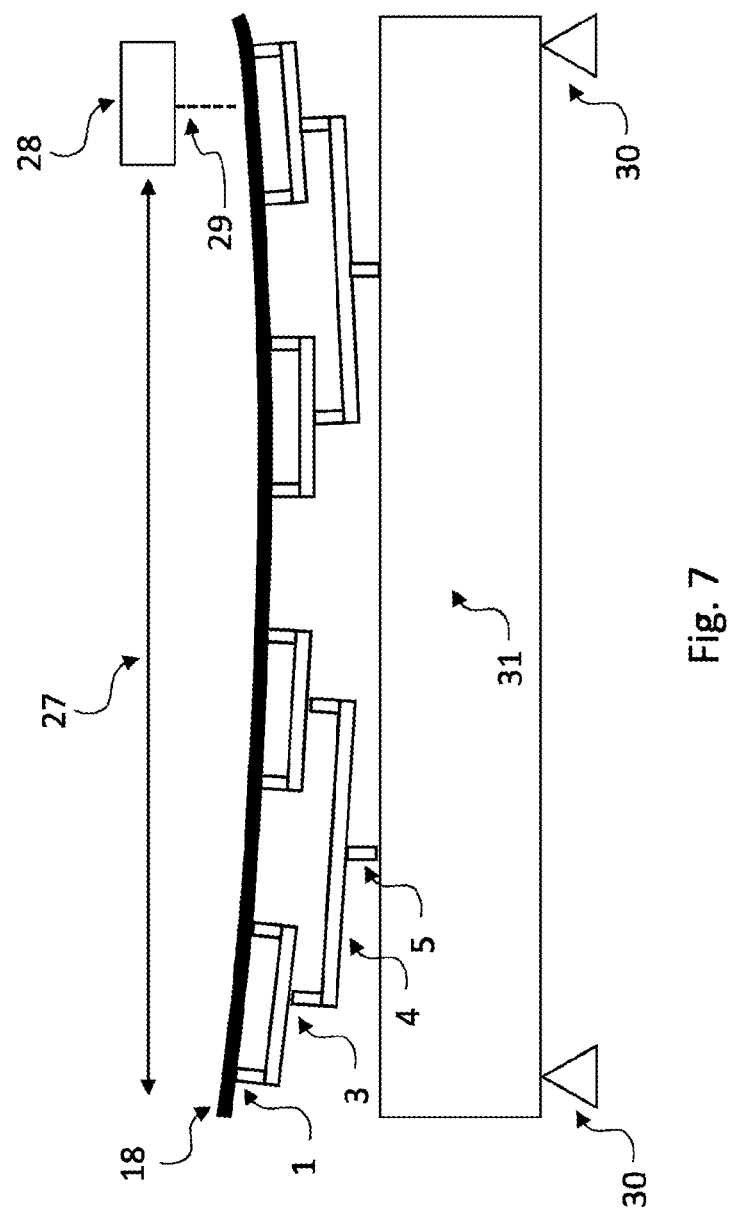
FIGS. 7-9 are schematic elevational side views of various configurations of the detecting machine according to the invention.

FIG. 7 shows an exemplary embodiment of the entire machine in an architecture with eight supports 1, wherein the working logic of the interconnecting elements 4 being balanced through the rotations in the joints 3 as a result of the constraint-reaction forces on the bar is shown. Figure shows the precision axis 27 and the laser sensor able to detect the geometry of the sections of the article along the baseline or the curvilinear abscissa. The sensor 28 also has the function of detecting the length and position of the article with respect to the symmetry of the support system, since this information may be useful to process curvilinear correction coefficients to compensate for the lengths and the asymmetry in the positioning. It is also possible to adopt lateral laser sensors for the detection on the horizontal plane of the article, especially if associated to the use of lateral free support means 21.

Figure 8:
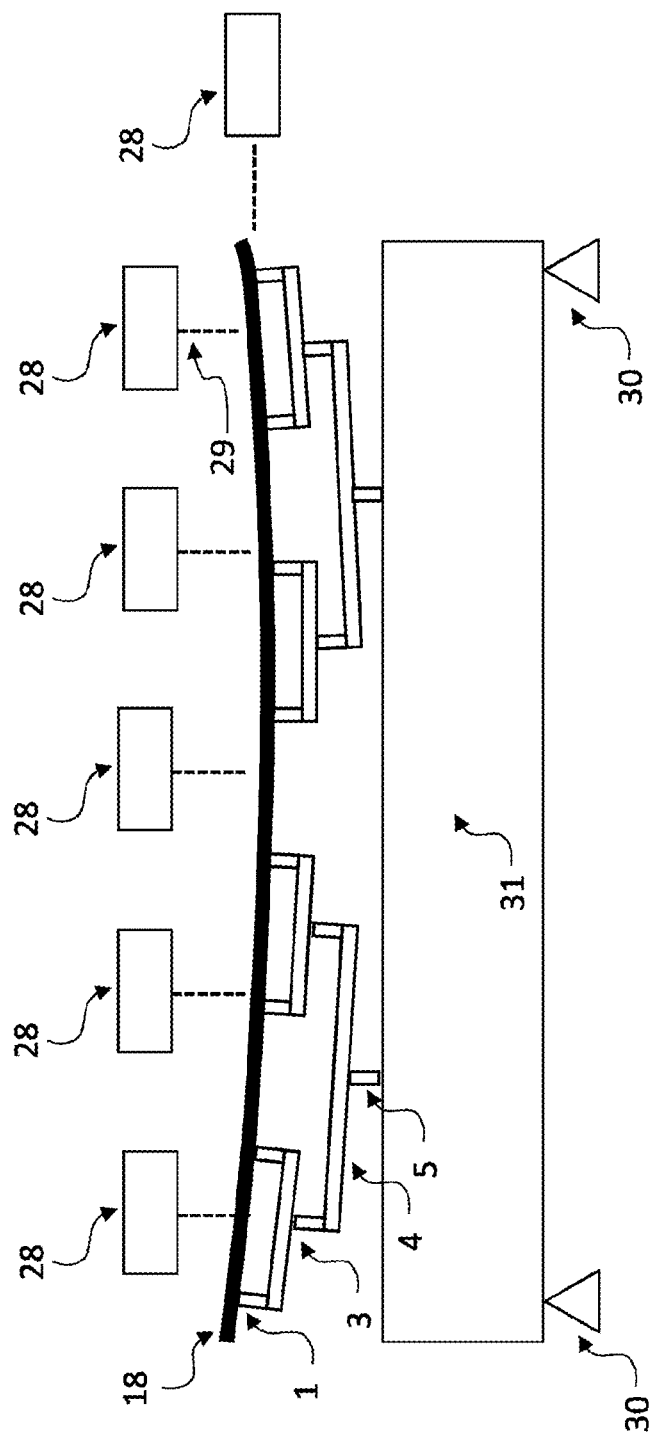

FIG. 8 shows another embodiment of the machine, optionally including fixed sensors 28 of different types (inductive, capacitive, eddy current) on the horizontal plane, vertical plane and/or for the axial positioning of the bar. These sensors are designed to detect the position at several points of the bar in order to determine its geometry.

Figure 9:
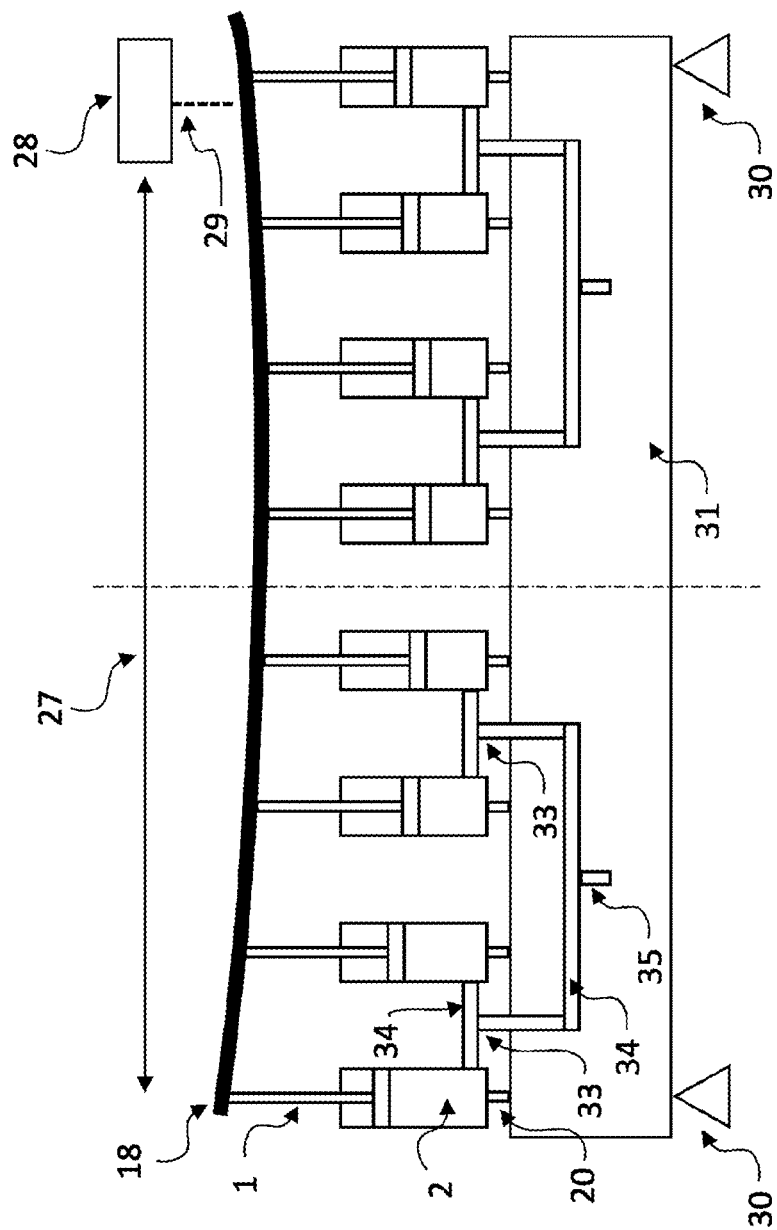

FIG. 9 shows an application scheme of the interconnection fluidic system with the specificity of the constraints 20 to the structure also illustrated in FIGS. 7 and 8.

In special configurations, it is possible to artificially unbalance the balancing arms, in order to rebalance articles of non-compliant length with respect to the preset configurations, namely compensating for any imbalances occurring when articles of non-compliant length with respect to the preset positions of the vertical constraints are supported, through the application of rebalancing forces: in this way, the system without the article would be balanced and it would be able to recover the balance also with the article to be detected.

It is possible to provide devices which are external to the balancing system for the application of forces to the article, in order to compensate with special logics for the discontinuities at the ends and for the edge effects.

As can be understood by the above disclosure, thanks to the configuration of the invention, it is possible to have a support system not affecting the geometry of the slender body to be measured, which advantageously increases the accuracy and the precision of the detecting machine.

It is understood, however, that the invention is not to be considered as limited by the particular arrangements illustrated above, which represent only exemplary embodiments of the same, but different variants are possible, all within the reach of a person skilled in the art, without departing from the scope of the invention itself, as defined by the following claims.

The invention claimed is:

1. A geometry-detecting machine for a slender body, comprising:
a fixed reference frame (30, 31) provided with at least one pair of constraint points (1) for said slender body and sensor means (28) for the spatial detection of the geometry of said slender body,
wherein said constraint points are in the shape of vertical constraints points (1, 3, 5) coupled in pairs by interconnecting means (4, 34) in turn making up vertical constraint points to be coupled in pairs on multiple layers until converging towards either a single final constraint point (32), in the case of traction vertical constraints, or two constraint points (5, 35) in the case of compression vertical constraints.

2. The geometry-detecting machine of claim 1, wherein, V being the constraint points in contact with said slender body, the overall number of constraint points is $2^N$, where N is an integer, interconnected in pairs in a number of sublayers equal to the logarithm in base two of the provided number V of constraints ($Log_2(V)$), with a symmetrical scheme with respect to the middle line (19) of the slender body to be detected.

3. The geometry-detecting machine of 2, wherein for each vertical constraint in contact with said slender body there are provided roller support means (21), so as to allow to the slender body to meander freely.

4. The geometry-detecting machine of claim 2, wherein said interconnection means are in the shape of pivoting arms (4) at least pivoting around horizontal axes.

5. The geometry-detecting machine of 4, wherein said sensor means (28) are in the shape of either rotation sensors of said pivoting arms (4) for each of said layers or position metres of said slender body section by section through profilometres or mechanical feelers.

6. The geometry-detecting machine of claim 1, wherein for each vertical constraint in contact with said slender body there are provided roller support means (21), so as to allow to the slender body to meander freely.

7. The geometry-detecting machine of claim 6, wherein said interconnection means are in the shape of pivoting arms (4) at least pivoting around horizontal axes.

8. The geometry-detecting machine of 7, wherein said sensor means (28) are in the shape of either rotation sensors of said pivoting arms (4) for each of said layers or position metres of said slender body section by section through profilometres or mechanical feelers.

9. The geometry-detecting machine of claim 1, wherein said interconnection means are in the shape of pivoting arms (4) at least pivoting around horizontal axes.

10. The geometry-detecting machine of claim 9, wherein said sensor means (28) are in the shape of either rotation sensors of said pivoting arms (4) for each of said layers or position metres of said slender body section by section through profilometres or mechanical feelers.

11. A geometry-detecting machine for a slender body, comprising:
a fixed reference frame (30, 31) provided with at least one pair of constraint points (1) for said slender body and a sensor element (28) for the spatial detection of the geometry of said slender body,
wherein said constraint points are in the shape of vertical constraints points (1, 3, 5) coupled in pairs by interconnecting elements (4, 34) in turn making up vertical constraint points to be coupled in pairs on multiple layers until converging towards either a single final constraint point (32), in the case of traction vertical constraints, or two constraint points (5, 35) in the case of compression vertical constraints.

12. The geometry-detecting machine of claim 11, wherein, V being the constraint points in contact with said slender body, the overall number of constraint points is $2^N$, where N is an integer, interconnected in pairs in a number of sublayers equal to the logarithm in base two of the provided number V of constraints ($Log_2(V)$), with a symmetrical scheme with respect to the middle line (19) of the slender body to be detected.

13. The geometry-detecting machine of claim 12, wherein for each vertical constraint in contact with said slender body there are provided roller support elements (21), so as to allow to the slender body to meander freely.

14. The geometry-detecting machine of claim 12, wherein said interconnection elements are in the shape of pivoting arms (4) at least pivoting around horizontal axes.

15. The geometry-detecting machine of 14, wherein said sensor element (28) are either rotation sensors of said pivoting arms (4) for each of said layers or position metres of said slender body section by section through profilometres or mechanical feelers.

16. The geometry-detecting machine of claim 11, wherein for each vertical constraint in contact with said slender body there are provided a roller support (21), so as to allow to the slender body to meander freely.

17. The geometry-detecting machine of claim 16, wherein said interconnection elements are in the shape of pivoting arms (4) at least pivoting around horizontal axes.

18. The geometry-detecting machine of 17, wherein said sensor element (28) are either rotation sensors of said pivoting arms (4) for each of said layers or position metres of said slender body section by section through profilometres or mechanical feelers.

19. The geometry-detecting machine of claim 11, wherein said interconnection elements are in the shape of pivoting arms (4) at least pivoting around horizontal axes.

20. The geometry-detecting machine of claim 19, wherein said sensor element (28) comprise either rotation sensors of said pivoting arms (4) for each of said layers or position metres of said slender body section by section through profilometres or mechanical feelers.

* * * * *